United States Patent [19]
Seta et al.

[11] Patent Number: 6,130,305
[45] Date of Patent: *Oct. 10, 2000

[54] PROPYLENIC COPOLYMER AND ITS FILM

[75] Inventors: Yasushi Seta; Ryoichi Tsunori; Satoshi Nakatsuka, all of Ichihara, Japan

[73] Assignee: Idemitsu Petrochemical Co., Ltd., Japan

[*] Notice: This patent is subject to a terminal disclaimer.

[21] Appl. No.: 08/955,450

[22] Filed: Oct. 21, 1997

[51] Int. Cl.⁷ .................................................. C08F 210/06

[52] U.S. Cl. ........................................ 526/348.1; 526/348

[58] Field of Search .................................. 526/348, 348.1

[56] References Cited

U.S. PATENT DOCUMENTS

| | | | |
|---|---|---|---|
| 4,309,521 | 1/1982 | Sato et al. | 526/114 |
| 5,330,949 | 7/1994 | Funabashi et al. | 502/111 |
| 5,597,881 | 1/1997 | Winter et al. | 526/348 |

*Primary Examiner*—David W. Wu
*Assistant Examiner*—Roberto Rabago
*Attorney, Agent, or Firm*—Parkhurst & Wendel LLP

[57] ABSTRACT

Disclosed are a binary random copolymer of propylene and ethylene, and a film to be formed by sheeting the copolymer. The film has good impact strength, good heat-sealability, high stiffness, good anti-blocking and slipping properties, and high transparency. As having excellent heat-sealability at low-temperature, the copolymer and its film are favorably used as substrate layers of laminated or co-extruded multi-layered films.

4 Claims, No Drawings

PROPYLENIC COPOLYMER AND ITS FILM

FIELD OF THE INVENTION

The present invention relates to a propylenic copolymer and its film. More precisely, the invention relates to a binary random copolymer of propylene and ethylene, and to a film to be formed by sheeting the copolymer, which is favorably used as substrate layers of laminated or co-extruded multi-layered films.

BACKGROUND OF THE INVENTION

As having good stiffness, transparency and moisture resistance, films such as biaxially-stretched films are widely used as wrapping films. Such films, however have a low heat-sealability. Therefore, for such wrapping films, preferred are multi-layered films having a sealant layer of a resin with good heat-sealability at low-temperature on one or both surfaces, to films of propylene homopolymers with poor heat-sealability at low-temperature.

For T die-cast films of crystalline propylene polymers which are widely used as wrapping films for bread, also preferred are laminated or co-extruded multi-layered films having a sealant layer of a resin with good heat-sealability at low-temperature on one or both surfaces.

In addition to their good low-temperature heat-sealability and high strength after heat sealing, films are further required to have good slipping and anti-blocking properties in the step of re-winding the films being produced, and also to have good outward appearance and good transparency. Moreover, desired are resins capable of being formed into high-quality films even in recent high-producible, large-scale sheeting machines and high-speed sheeting machines.

Moreover, since the resins for such heat-sealing layers are expensive, the recent tendency is toward thinner laminate films having higher stiffness while exhibiting much higher heat-sealing strength. In order to meet those requirements, not only the resin characteristics of heat-sealing layers but also those of substrate layers have been improved. For example, one attempt is to copolymerize propylene with ethylene, 1-butene or the like comonomer to give resin substrate layers, which, however, is still problematic in that the copolymerization greatly lowers the crystallinity of the resins formed and therefore the resins could not have good stiffness.

On the other hand, in general, wrapping films are formed into bags through heat sealing, then the bags are charged with contents and closed also through heat sealing, and thereafter final consumers open the sealed bags to take out the contents. Thus, the process from the sheeting of those wrapping films to the end of their role takes a long period of time. Therefore, wrapping films are required to maintain their good quality, especially impact resistance, for the necessary period of time and under ordinary temperature conditions. Unfortunately, however, no example is known at least at present that is capable of satisfactorily removing the unfavorable phenomena of wrapping films, such as the reduction in their impact resistance and the reduction in their transparency.

SUMMARY OF THE INVENTION

One object of the invention is to provide a propylenic random copolymer capable of being sheeted into films having good heat-sealability at low-temperature and being favorably used as a substrate of laminated or co-extruded muliti-layered films without interfering with the intrinsic good characteristics of polypropylene films.

We, the present inventors have assiduously studied in order to attain the above-mentioned objects of the invention and, as a result, have found that, when a propylenic copolymer having the specific characteristics mentioned below and containing a reduced amount of sticky components is sheeted into films, the resulting films have good slipping and anti-blocking properties and have extremely excellent heat-sealability at low-temperature. On the basis of these findings, we have completed the present invention.

Specifically, the invention provides a propylenic copolymer and its film having good heat-sealability at low-temperature and being favorably used as substrate of laminated or co-extruded muliti-layered films without interfering with the intrinsic good characteristics of polypropylene films, which are as follows:

[1] A propylenic copolymer of propylene and ethylene, which satisfies the following (1) to (3):
(1) The ethylene unit content (x, wt. %) of the copolymer is from 0.2 to 4 wt. %.
(2) The relation between the boiling diethyl ether extraction (E, wt. %) of the copolymer and x satisfies the following (I):

$$E \leq 0.25x + 1.1 \quad (I)$$

(3) The relation between the melting point (Tm, °C.) of the copolymer as measured with a differential scanning calorimeter and x satisfies the following (II):

$$Tm \leq 165 - 5x \quad (II)$$

[2] The propylene-ethylene copolymer of [1], which further satisfies the following (4) and (5):
(4) The copolymer has a melt index (MI, g/10 min) of from 4 to 12 g/10 min.
(5) The isotactic triad fraction (mm, mol %) in the PPP sequence of the copolymer, as measured in $^{13}$C-NMR, is not smaller than 98.0 mol %.

[3] The propylenic copolymers of [1], in which the propylenic random copolymer further satisfies the following (6):
(6) The relation between the melt index (MIa, g/10 min) of the copolymer and the time of relaxation ($\tau$, sec) of the copolymer as obtained through measurement of frequent dependency at a frequency $c\omega = 100$ rad/sec satisfies the following (III):

$$\tau \leq 0.65 - 0.025 \, MI \quad (III)$$

[4] A film as formed by sheeting the propylenic random copolymer of [1], [2] or [3].

The propylene-ethylene copolymer having from 3 to 4 wt. % of the ethylene unit content of the copolymer and 140° C. of the melting point of the copolymer as measured with a differential scanning calorimeter is favorably used as a heat-sealing layer of laminated or co-extruded multi-layered film by its excellent heat-sealability at the low-temperature.

PREFERRED MODES OF CARRYING OUT THE INVENTION

Now, the invention is described in detail hereinunder.

The propylenic copolymer of the invention is obtained through copolymerization of propylene and ethylene, and satisfies the following (1) to (3):
(1) The ethylene unit content (x, wt. %) of the copolymer is from 0.2 to 4 wt. %, preferably from 0.5 to 3.5 wt.

%, more preferably from 0.7 to 3 wt. %. If x is less than 0.2 wt. %, the meltability at low-temperature of the copolymer is poor. In addition, if so, the crystallinity of the copolymer is too high, resulting in that the transparency and impact resistance of a film to be formed from the copolymer will be poor when the film is formed at a high sheeting speed. On the other hand, if x is more than 4 wt. %, the stiffness of the copolymer tends to be low and a large amount of the sticky component will be formed, resulting in that the anti-blocking property of the film to be formed thereon is also lowered.

(2) The relation between the boiling diethyl ether extraction (E, wt. %) of the copolymer and x satisfies the following (I):

$$E \leq 0.25x + 1.1 \tag{I}$$

If E oversteps the defined range, the anti-blocking property of the film to be formed of the copolymer is poor. And the meltability at low-temperature of the copolymer is poor.
Preferably;

$$E \leq 0.2x + 1.1 \tag{I'}$$

(3) The relation between the melting point (Tm, °C.) of the copolymer as measured with a differential scanning calorimeter and x satisfies the following (II):

$$Tm \leq 165 - 5x \tag{II}$$

If Tm oversteps the defined range, the meltability at low-temperature of the copolymer is poor.
Preferably;

$$Tm \leq 162 - 5x \tag{II'}$$

Preferably, the propylenic random copolymer of the invention additionally satisfies at least one of the following (4) or (5):

(4) The copolymer has a melt index (MI, g/10 min) of from 4 to 12 g/10 min, preferably from 5 to 10 g/10 min.

If MI is lower than 4 g/10 min, the transparency and impact resistance of the layer of the copolymer will be often poor. However, if it is higher than 12 g/10 min, the copolymer will be often sheeted into failed films.

(5) The isotactic triad fraction (mm, mol %) in the PPP sequence of the copolymer, as measured in $^{13}$C-NMR, is not smaller than 98 mol %, preferably not smaller than 98.5 mol %.

If mm is smaller than 98 mol %, the copolymer shall contain a large amount of sticky components, resulting in that its anti-blocking property tend to be poor. In addition, since the crystallinity of the copolymer tend to be lowered, often resulting in that its stiffness is lowered. Moreover, since the melting point depression in the copolymer relative to the comonomer amount is small, often resulting in that the meltability at low-temperature will be poor.

More preferably, the propylenic random copolymer of the invention additionally satisfies at least one of the following (6):

(6) The relation between the melt index (MI, g/10 min) of the copolymer and the time of relaxation (τ, sec) of the copolymer as obtained through measurement of frequent dependency at a frequency $\omega_0 = 10^0$ rad/sec satisfies the following (III):

$$\tau \leq 0.65 - 0.025 \, MI \tag{III}$$

If τ oversteps the defined range, the transparency and impact resistance of the layer of the copolymer will be often poor when the copolymer is sheeted into the layer at a high sheeting speed.

In particular, more preferred is the relation satisfying the following:

$$\tau \leq 0.63 - 0.025 \, MI \tag{III'}$$

The propylenic copolymer and the film of the propylenic copolymer have good impact strength, good heat-sealability, high stiffness, good anti-blocking and slipping properties, and high transparency. In addition, even when the copolymer is sheeted at a high sheeting speed, the quality of the film formed is lowered little. Moreover, the decrease of film impact resistance by time is small.

The propylenic random copolymer of the invention can be formed into film having especially good heat-sealability at low-temperature. The resulting single-layered film, and even multi-layered film comprising the film of the propylenic random copolymer of the invention and single-layered or multi-layered film of other resins can be used favorably for wrapping use and in other various applications. The other resins include, for example, polyolefin resins such as polypropylene resins, as well as polyester resins, ethylene-vinyl acetate copolymers (EVA), etc.

The above multi-layered films can be produced by separately preparing the substrate layer and the surface layer followed by laminating them in a known dry-laminating method, or can be produced at a time by co-extruding the each layers in a known co-extruding method.

In such a multi-layered film, it is especially advantageous that a surface layer of other resins is laminated or co-extruded on at least one surface of a substrate layer of the copolymer of the invention to give multi-layered films.

The propylenic copolymer can be produced under specific polymerization conditions in the presence of specific catalysts, for example, in the manner mentioned hereinunder. However, such specific conditions and specific catalysts are not limitative.

The catalysts usable in producing the propylenic copolymer comprise, for example, (a) a solid catalyst component (a) consisting essentially of magnesium, titanium and a halogen, (b) a catalyst component of an organic metal compound such as an organic aluminium compound, and (c) a catalyst component of an electron donor compound such as an organic silicon compound. Concretely, the following catalyst components are employable herein.

(a) Solid Catalyst Component:

Preferred carriers for the solid catalyst component can be obtained by reacting a metal magnesium, an alcohol, and a halogen and/or a halogen-containing compound.

The metal magnesium may be in any form of granular, ribbon-like, or powdery ones. Preferably, the metal magnesium is not coated with any substance other than metal magnesium, such as magnesium oxide.

The alcohol is preferably a lower alcohol having from 1 to 6 carbon atoms, such as methanol or ethanol. Especially preferred is ethanol, as easily giving good catalysts having high activity.

The halogen is preferably chlorine, bromine or iodine. Of those, especially preferred is iodine. As the halogen-containing compound, preferably used is $MgCl_2$ or $MgI_2$.

The amount of the alcohol to be used is preferably from 2 to 100 mols, more preferably from 5 to 50 mols, per mol of the metal magnesium.

The amount of the halogen or halogen-containing compound to be used may be generally 0.0001 gram-atoms or more, preferably from 0.0005 to 0.1 gram-atoms, especially preferably from 0.001 to 0.06 gram-atoms or more, in terms of the amount of the halogen atom itself or of the amount of the halogen atom in the halogen-containing compound, relative to 1 gram-atom of the metal magnesium. One or more halogens or halogen-containing compounds can be used either singly or as combined.

The carrier of the catalyst for use in the invention can be obtained generally by reacting the metal magnesium, alcohol, and halogen and/or halogen-containing compound, for example, under reflux (at about 79° C.) until hydrogen gas is no longer formed, generally for from 20 to 30 hours. This reaction is preferably effected in an inert gas atmosphere such as nitrogen gas or argon gas.

The thus-obtained carrier is filtered out and dried, optionally after having been washed with an inert solvent such as heptane, and is used in producing the solid catalyst component (a).

Preferably, the carrier is nearly granular, while having a narrow grain size distribution to give a sharp peak. More preferably, the variation in the shape of each grain constituting the carrier is as small as possible. Concretely, the sphericity (S) of each grain to be represented by the following (IV) is preferably less than 1.60, more preferably less than 1.40, and the grain size distribution index (P) to be represented by the following (V) is preferably less than 5.0, more preferably less than 4.0.

$$S=(E1/E2)^2 \qquad (IV)$$

wherein E1 indicates the length of the projected border line of each grain; and E2 indicates the circumference of the circle of which the area is the same as the projected area of each grain.

$$P=D90/D10 \qquad (V)$$

wherein D90 indicates a grain size corresponding to the weight cumulative fraction of 90%. In other words, D90 means that the weight sum of the grains having a grain size smaller than the grain size represented by D90 is 90% of the total weight sum of all grains. The same shall apply also to D10.

The solid catalyst component is produced by contacting the carrier with at least a titanium compound.

The titanium compound may be one represented by a general formula (VI):

$$TiX^1_n(OR^1)_{4-n} \qquad (VI)$$

wherein $X^1$ represents a halogen atom, especially preferably a chlorine atom; $R^1$ represents a hydrocarbon group having from 1 to 10 carbon atoms, especially preferably a linear or branched alkyl group, and plural $R^1$'s, if any, may be the same or different; and n is an integer of from 0 to 4.

Concretely, the titanium compound includes $Ti(O-i-C_3H_7)_4$, $Ti(O-C_4H_9)_4$, $TiCl(O-C_2H_5)_3$, $TiCl(O-i-C_3H_7)_3$, $TiCl(O-C_4H_9)_3$, $TiCl_2(O-C_4H_9)_2$, $TiCl_2(O-i-C_3H_7)_2$, $TiCl_4$. Of those, especially preferred is $TiCl_4$.

Generally, the solid catalyst component is produced by further contacting the carrier with an electron donor compound.

The electron donor compound is preferably an aromatic dicarboxylate, especially preferably di-n-butyl phthalate.

While the carrier is contacted with the titanium compound and the electron donor compound, in general, it is further contacted with a halogen-containing silicon compound. The halogen-containing silicon compound is preferably silicon tetrachloride.

The solid catalyst compound can be produced in any known manner. For example, the carrier is added to a solvent along with an electron donor compound and a halogen-containing silicon compound such as those mentioned above; then a titanium compound such as that mentioned above is added thereto with stirring, and all those are reacted. The solvent is preferably an inert hydrocarbon such as pentane, hexane, heptane or octene. The electron donor compound is used generally in an amount of from 0.01 to 10 mols, preferably from 0.5 to 5 mols, per mol of the carrier in terms of the magnesium atom; and the titanium compound is used generally in an amount of from 1 to 50 mols, preferably from 2 to 20 mols, per mol of the carrier in terms of the magnesium atom. The reaction is effected by contacting the components with each other, generally at a temperature falling between 0 and 200° C. for from 5 minutes to 10 hours, preferably between 30 and 150° C. for from 30 minutes to 5 hours.

After the reaction, it is preferred that the solid catalyst component formed is washed with an inert hydrocarbon (e.g., n-hexane, n-heptane).

(b) Organic Metal Catalyst Component:

Of the catalyst components, the organic metal compound is preferably an organic aluminium compound.

For this, widely used are organic aluminium compounds of the following general formula (VII):

$$AlR^2_nX^2_{3-n} \qquad (VII)$$

wherein $R^2$ represents an alkyl group having from 1 to 10 carbon atoms, a cycloalkyl group, or an aryl group; $X^2$ represents a halogen atom and is preferably a chlorine or bromine atom; and n is an integer of from 1 to 3.

Concretely, the compounds include trialkyl aluminium compounds such as trimethyl aluminium, triethyl aluminium, triisobutyl aluminium; and also diethylaluminium monochloride, diisobutylaluminium monochloride, diethylaluminium monoethoxide, ethylaluminium sesquichloride, etc. Of those, preferred are triethyl aluminium and triisobutyl aluminium. One or more of those compounds can be used either singly or as combined.

(c) Electron Donor Compound:

Of the catalyst components, the electron donor compound to act on the polymerization system is preferably an organic silicon compound. Especially preferred are dicyclopentyldimethoxysilane.

The solid catalyst component is used in the intended polymerization, preferably after having been pre-treated. To pre-treat it, preferably, it is reacted with a small amount of propylene introduced, under the condition of the existence of the solid catalyst component, organic metal compound and an electron donor compound such as those mentioned hereinabove with stirring them. Where the solid catalyst component and so on are put into the reactor, it is preferable that those components are solved in a proper solvent before being put into to avoid the solid catalyst component from adhering to the inner wall of the reactor. The solvent is preferably discharged from the reactor at latest up to the initial stage of the reaction. Such a solvent is preferably an inert hydrocarbon such as pentane, hexane, heptane, octene or the like. The organic metal compound is used in an amount of generally from 0.01 to 10 mols, preferably from 0.05 to 5 mols, per mol of the titanium atom in the solid catalyst component; and the electron donor compound is used in an amount of generally from 0.01 to 20 mols, preferably from 0.1 to 5 mols, per mol of the titanium atom in the solid catalyst. Propylene is added to the catalyst system at a propylene partial pressure higher than an atmospheric pressure, with which the solid catalyst is pre-treated preferably at from 0 to 100° C. for from 0.1 to 24 hours. After the reaction, preferably, the pre-treated catalyst is washed with an inert hydrocarbon such as n-hexane or n-heptane.

The propylenic random copolymer of the invention is produced, for example, by feeding predetermined amounts of propylene and ethylene under the existence of the solid catalyst component, the organic metal compound and the electron donor compound all mentioned above and reacting with stirring. The solid catalyst component used in the intended polymerization is preferably put into a reactor after solving them to a proper solvent such as the above-mentioned inert hydrocarbon to avoid the solid catalyst component from adhering to the inner wall of the reactor. The solvent is preferably discharged from the reactor at latest up to the initial stage of the reaction. The polymerization generally takes place under the condition that, for example, the monomers are copolymerized generally at a propylene partial pressure not lower than an atmospheric pressure, preferably between atmospheric pressure and 40 kg/cm$^2$, and at a temperature falling between −80 and 150° C., preferably between 20 and 150° C. The organic metal compound is used generally in an amount of from 0.1 to 400 mols, preferably from 1 to 200 mols, per mol of the titanium atom in the solid catalyst component; and the electron donor compound is used generally in an amount of from 0.1 to 100 mols, preferably from 1 to 50 mols, per mol of the titanium atom in the solid catalyst.

The ethylene content of the propylenic random copolymers shall be changed by controlling the ethylene partial pressure and the amount of ethylene to be fed into the polymerization system; and the molecular weight of those copolymers shall be changed by controlling the amount of hydrogen to be introduced into the polymerization system.

The propylenic random copolymer of the invention can contain, if desired, any ordinary additives such as antioxidants, neutralizing agents, slipping aids, anti-blocking aids, and antistatic agents.

The propylenic random copolymer of the invention can be sheeted into films through T-die casting or melt extrusion. For those copolymers, preferred is a T-die casting method of sheeting the copolymer into films with a large-scale sheeting machine at a high sheeting speed. In such a T-die casting method, the copolymer can be sheeted into good films having a thickness of from 10 to 500 μm even under a high-speed sheeting condition, for example, at a film taking-up speed of 50 m/min or higher.

The propylenic random copolymer having been produced in the manner mentioned hereinabove, is characterized in that its PPP sequence has a high degree of stereoregularity and can be highly randomly copolymerized with ethylene. After having been thus highly randomly copolymerized with ethylene, the resulting propylenic random copolymer has high crystallinity while having a low melting point. In addition, since the ethylene is well dispersed in the copolymer, the melting point of the copolymer can be effectively lowered even though the ethylene content in the copolymer is small. Moreover, since the sticky components in the copolymer measured in terms of the boiling diethyl ether-soluble content of the copolymer are small, the film of the coplymer has high stiffness and good heat-sealability at the low-temperature without interfering with the intrinsic good characteristics of polypropylene films.

The films of the propylenic copolymer also have good anti-blocking and slipping properties, and high transparency. In addition, even when the copolymer is sheeted at a high sheeting speed, the quality of the film formed is lowered little. Moreover, the decrease of film impact resistance by time is small.

Now, the invention is described in more detail with reference to the following Examples, which, however, are not intended to restrict the scope of the invention.

First mentioned are the methods for determining the characteristics of resins, the method of forming films; and the methods for evaluating the quality of films.

(A) Methods for Determining the Characteristics of Resins:
1) Ethylene Content of Copolymer (x, wt. %):

To determine the ethylene content of a copolymer, the copolymer is sheeted into a film having a thickness of 300 μm under the condition mentioned below, and the absorbance of the film at 718 and 733 cm$^{-1}$ was measured with FT/IR5300 (manufactured by Nippon Bunko KK). From the absorbance thus measured, the ethylene content, x, of the copolymer was obtained in accordance with the equations mentioned below.

Sheeting Condition:
Press temperature: 220° C.
Pressure at Hot press or cold press: 50 kg/cm$^2$G
Period of pre-heating: 5 min
Period of hot press: 5 min
Period of cold press: 3 min IR Condition:
Number of integration: 20
Resolution: 4 cm$^{-1}$ Ethylene Content (x, wt. %):
x1=0.599×(A733/d·l)−0.161×(A718/d·l)
x2=0.599×(A718/d·l)−0.161×(A733/d·l)
x =0.809×(x1+x2) wherein;
A718 is an absorbance at 718 cm$^{-1}$;
A733 is an absorbance at 733 cm$^{-1}$;
d is 0.9; and
l is the thickness of the sample.

2) Melt Index (MI, g/10 min):

The melt index of a copolymer was measured at a temperature of 230° C. and under a load of 2160 g, according to JIS K7210.

3) Boiling Diethyl Ether Extraction (E, wt. %):

3 g of pellets of a copolymer sample that had been ground to pass through a 1 mm φ mesh were put into a cylindrical filter, while 160 ml of an extraction solvent of diethyl ether was put into a flat bottom flask. The pellets were extracted with the solvent, using a Soxhlet's extractor, at a reflux frequency of 1 time/5 min or so for 10 hours. After the extraction, diethyl ether was recovered, using an evaporator, and then dried in a vacuum drier to have a constant weight, from which was obtained the boiling diethyl ether extraction of the sample.

4) Melting Point of Copolymer as Measured with Differential Scanning Calorimeter (Tm, °C.):

Using a differential scanning calorimeter (DSC7, manufactured by Perkin-Elmer Co.), 10 mg of a copolymer sample was first melted in a nitrogen atmosphere at 230° C. for 3 minutes, and then cooled to 40° C. at a cooling rate of 10° C./min. Then, the sample was kept at 40° C. for 3 minutes, and then heated at a heating rate of 10° C./min to obtain a melting endothermic curve of the sample. The peak top of the highest peak of the curve indicates the melting point of the sample.

5) Isotactic Triad Fraction in the PPP Sequence of Copolymer and Film as Measured in $^{13}$C-NMR (mm, mol %):

The isotactic triad fraction in the PPP sequence of the propylenic copolymer or the propylenic copolymer film of the invention indicates the isotactic fraction of the triad units in the PPP sequence of the copolymer molecular chains constituting the propylenic copolymer or the propylenic copolymer film, and can be obtained from the $^{13}$C-NMR spectrum of the copolymer or the film.

The fraction, mm, of a propylene homopolymer can be obtained from the following equation (VIII):

$$mm\ [Imm/(Imm+Imr+Irr)]\times100\ (mol\ \%) \qquad (VIII)$$

wherein Imm, Imr and Irr each indicate the peak intensity in each of three methyl carbon regions, mm, mr and rr, respectively, in the $^{13}$C-NMR spectrum of the homopolymer sample. The mm region falls between 21.4 and 22.2 ppm of the chemical shifts; the mr region falls between 20.6 and 21.4 ppm of the chemical shifts; and the rr region falls between 19.8 and 20.6 ppm of the chemical shifts.

On the other hand, in the $^{13}$C-NMR spectrum of a propylenic random copolymer, the chemical-shift of the methyl carbon in the propylene unit is influenced by the adjacent ethylene unit. Concretely, the absorption peak derived from the methyl carbon of the propylene unit existing in the EPE sequence of the copolymer appears in the rr region, while the absorption peak derived from the methyl carbon of the propylene unit existing in the center of the PPE sequence of the copolymer appears in the mr region.

The absorption peak intensity derived from the methyl carbon of the propylene unit existing in the EPE sequence corresponds to the peak intensity for $T\delta\delta$ (33.3 ppm). The absorption peak intensity derived from the methyl carbon of the propylene unit existing in the center of the PPE sequence corresponds to the peak intensity for $S\alpha\gamma$ (38.0 ppm).

To obtain the isotactic triad fraction, mm, in the PPP sequence of the propylenic random copolymer, used is the following equation (IX):

$$mm=Imm/[Imm+(Imr-S\alpha\gamma)+(Irr-T\delta\delta)]\times100\ (mol\ \%) \qquad (IX)$$

The $^{13}$C-NMR spectrum of the copolymer sample was obtained, using an NMR device, JNM-EX400 Model (manufactured by Nippon Electronic Co.) under the condition mentioned below.

Sample concentration: 220 mg/3 ml of NMR solvent
NMR solvent: 1,2,4-trichlorobenzene/deuterated benzene (90/10, vol %)
Temperature: 130° C.
Pulse width: 45°
Pulse frequency: 4 seconds
Number of integration: 4000
6) Time of Relaxation ($\tau$, sec):

Using a rotary rheometer (manufactured by Rheometrics Co.), a copolymer sample as put on a Cohn plate (diameter 25.0 mm; Cohn angle 0.10 radians) was subjected to frequency dispersion at a temperature of 175° C. and at a frequency $\omega_0=10°$ rad/sec. The time of relaxation of the sample ($\tau$, sec) was obtained as follows:

$$G^*(i\omega)=s^*/g^*=G'(\omega)+iG''(\omega)$$

where;

$G^*(i\omega)$ indicates a complex modulus of visco-elasticity of the sample, which is defined by $\sigma^*/\gamma^*$;
$\sigma^*$ indicates the stress of the sample;
$\gamma^*$ indicates the strain of the sample.

$$\tau(\omega)=G'(\omega)/\omega G''(\omega)$$

where;

$\omega$ indicates the frequency (rad/sec);
$G'$ indicates the storage modulus of visco-elasticity;
$G''$ indicates the loss modulus of visco-elasticity.

(B) Method of Forming Films:

Using a 75 mm $\phi$ sheeting machine (manufactured by Mitsubishi Heavy Industries, Ltd.), pellets of the propylenic random copolymer or those of the propylene homopolymer as obtained in the following Examples and Comparative Examples were sheeted into 30 $\mu$m-thick films under the conditions mentioned below.

Sheeting temperature: 265° C.
Chill roll temperature: 25° C.
Taking-up Speed: 150 m/min (C) Methods for Evaluating the Quality of Films:

To evaluate their quality, all film samples were kept at a temperature of 23±2° C. and at a humidity of 50±10% for 16 hours or longer, and then subjected to the quality tests mentioned below under the same condition with respect to the ambient temperature and humidity.

1) Heat-sealing characteristic:

The heat-sealing characteristic of each sample was measured in accordance with JIS K-1707 under the sealing condition mentioned below. The temperature of the heat seal bar used was calibrated with a surface thermometer. After having been sealed, the sample was left at room temperature for one full day, and thereafter its peeling strength was measured at room temperature in a T-type peeling method in which the peeling rate was 200 mm/min. The heat-sealing temperature was obtained from the sealing temperature/peeling strength curve, at which the peeling strength was 300 g/15 mm.

Sealing time: 2 seconds
Sealed area: 15×10 mm
Sealing pressure: 5.3 kg/cm$^2$
Sealing temperature: several points in which the heat-sealing temperature was interpolated.

2) Modulus of tensile elasticity:

The modulus of tensile elasticity of each sample was measured in the tensile test of JIS K7127, under the condition mentioned below. The modulus of tensile elasticity of each sample after having been kept at 50° C., 60° C. or 70° C. for a week was also measured in the same manner.

Cross head speed: 500 min/min
Direction: machine direction (MD direction)
Load cell: 10 kg 3) Anti-blocking characteristic:

Two sheets of a film sample were kept in close contact with each other under the four kinds of conditions mentioned below, and then peeled, whereupon the peeling strength was measured. The peeling strength thus measured indicates the anti-blocking characteristic of the sample.

Condition for close contact of two films:
Condition 1:
 Temperature: 60° C.
 Time: 3 hour
 Load weight: 36 g/cm$^2$
Condition 2:
 Temperature: 50° C.
 Time: One week
 Load weight: 15 g/cm$^2$
Condition 3:
 Temperature: 60° C.
 Time: one week
 Load weight: 15 g/cm$^2$ Condition 4:
  Temperature: 70° C.
  Time: One week
  Load weight: 15 g/cm$^2$
Condition for peeling test:
  Test speed: 20 mm/min
  Load cell: 2 kg
4) Slipping characteristic:

A thread coated with a film sample was put on a glass sheet coated with the same film sample, and the glass sheet was gradually inclined whereupon the angle (θ) of the glass sheet at which the thread began to slip was measured. The data of tanθ indicates the slipping characteristic of the sample. In this was used a friction angle meter (manufactured by Toyo Seiki Seisaku-sho Co.), and the test was effected under the following conditions.

Surfaces for the measurement: metal roll surface/metal roll surface
  Inclining rate: 2.7°/sec
  Thread weight: 1 kg
  Area of cross section of thread: 65 cm$^2$
  Interfacial pressure: 15 g/cm$^2$ 5) Transparency (haze):

The haze of each film sample was measured according to JIS K7105, which indicates the transparency of the sample.

6) Impact resistance:

Using a film impact tester (manufactured by Toyo Seiki Seisaku-sho Co.) provided with a ½ inch impact head, each film sample was tested to obtain its impact breaking strength, which indicates the impact resistance of the sample. Each film sample was also tested to obtain its impact breaking strength after having been kept at 50° C., 60° C. or 70° C. for a week.

EXAMPLE 1

(A) Propylenic Random Copolymers
(1) Preparation of Magnesium Compound

A reactor (inner volume: 500 liters) equipped with a stirrer was fully purged with nitrogen gas, into which were put 97.2 kg of ethanol, 640 g of iodine, and 6.4 kg of metal magnesium, and reacted with stirring under reflux until hydrogen gas was no longer formed. Thus was formed a solid reaction product. The reaction mixture containing this solid product was dried under reduced pressure to obtain the intended magnesium compound (carrier of solid catalyst).

(2) Preparation of Solid Catalyst Component

A reactor (inner volume: 500 liters) equipped with a stirrer was fully purged with nitrogen gas, into which were put 30 kg of the magnesium compound (not ground), 150 liters of pure heptane (n-heptane), 4.5 liters of silicon tetrachloride, and 5.4 liters of di-n-butyl phthalate. The reaction system was kept at 90° C., into which was added 144 liters of titanium tetrachloride with stirring, and reacted at 110° C. for 2 hours. Next, the solid component was separated and washed with pure heptane at 80° C., to which was added 228 liters of titanium tetrachloride and reacted at 110° C. for 2 hours. After having been fully washed with pure heptane, a solid catalyst component was obtained.

(3) Pre-treatment:

230 liters of pure heptane was put into a reactor (inner volume: 500 liters) equipped with a stirrer, into which were added 25 kg of the solid catalyst component, 1.0 mol/mol, relative to the titanium atom in the solid catalyst component, of triethyl aluminium, and 1.8 mols/mol, relative to the same, of dicyclopentyldimethoxysilane. Next, propylene was introduced into the reactor to have a propylene partial pressure of 0.3 kg/cm$^2$G, and reacted at 25° C. for 4 hours. After the reaction, the solid catalyst component was washed several times with pure heptane, and then processed with carbon dioxide for 24 hours with stirring.

(4) Polymerization

Into a polymerization reactor (inner volume: 200 liters) equipped with a stirrer, fed was the pre-treated solid catalyst component at a rate of 3 mmols/hr in terms of the titanium atom in the component, along with 4 mmols/kg-PP of triethyl aluminium and 1 mmol/kg-PP of dicyclopentyldimethoxysilane, and propylene and ethylene were fed thereinto and copolymerized at a copolymerization temperature of 80° C. and under a copolymerization pressure (total pressure) of 28 kg/cm$^2$G. In this copolymerization, the ethylene concentration in the reactor was controlled to be 0.7 mol %, while the hydrogen concentration therein was 3.4 mol %, whereby the copolymer obtained might have a predetermined ethylene content and a predetermined molecular weight.

The ethylene concentration and the hydrogen concentration were obtained through compositional analysis of the gaseous phase in the reactor according to gas chromatography.

(5) Formulation of Additives

The following additives were added to the powdery propylenic copolymer thus obtained, and the resulting mixture was kneaded and extruded out into pellets, using a kneader.

1) Antioxidants
  Irganox 1010 (Ciba Specialty Chemicals): 1000 ppm
  Irgafos 168 (Ciba Specialty Chemicals): 1000 ppm
2) Neutralizing Agent, calcium stearate: 1000 ppm
3) Anti-blocking Aid: 2000 ppm
4) Slipping Aid, erucic acid amide: 1000 ppm The resin characteristics of the pellets of the propylenic random copolymer thus obtained were evaluated according to the methods (A) mentioned above. These pellets were sheeted into films according to the method (B) mentioned above. The quality of the films were evaluated according to the methods (C) mentioned above. The data obtained are shown in Table 2 below.

EXAMPLES 2 AND 3

Propylenic random copolymers of Examples 2 and 3 were produced in the same manner as in Example 1, except that the ethylene concentration and the hydrogen concentration in the copolymerization system were changed to those in Table 1 below to thereby control the ethylene content and the molecular weight of those copolymers. The resin characteristics of the propylenic random copolymer pellets obtained herein were evaluated according to the methods (A) mentioned above, and their data are shown in Table 2.

Comparative Example 1

A polypropylene was produced in the same manner as in Example 1, except that no ethylene was fed into the polymerization system. The resin characteristics of the thus-obtained copolymer pellets were evaluated according to the methods (A) mentioned above, and the data obtained are shown in Table 2.

Comparative Example 2

A propylenic random copolymer was produced in the same manner as in Example 1, except that diethyl phthalate was used in place of di-n-butyl phthalate, that cyclohexylmethyldimethoxysilane was used in place of dicyclopentyldimethoxysilane, and that the ethylene concentration and the hydrogen concentration in the reactor were 1.5 mol % and 3.6 mol %, respectively. The resin characteristics of the thus-obtained copolymer pellets were evaluated according to the methods (A) mentioned above, and the data obtained are shown in Table 2.

Comparative Example 3

A polypropylene was produced in the same manner as in Example 1, except that diethyl phthalate was used in place of di-n-butyl phthalate, that cyclohexylmethyldimethoxysilane was used in place of dicyclopentyldimethoxysilane, and that 0.1 mmol/kg-PP of cyclohexylmethyldimethoxysilane and no ethylene were fed into the polymerization system and that was fed into the polymerization system. The resin characteristics of the thus-obtained copolymer pellets were evaluated according to the methods (A) mentioned above, and the data obtained are shown in Table 2.

TABLE 1

|  | Example 2 | Example 3 | Example 4 | Example 5 |
|---|---|---|---|---|
| Ethylene Concentration (mol %) | 1.3 | 1.6 | 1.2 | 1.9 |
| Hydrogen Concentration (mol %) | 3.5 | 4.2 | 4.3 | 5.2 |

Concentration: Data of compositional analysis of the gaseous phase in the reactor (according to gas chromatography).

istics of the propylenic random copolymer pellets obtained herein were evaluated according to the methods (A) mentioned above, and their data are shown in Table 3. These pellets were sheeted into 25 μm-thick film according to the method (B) mentioned above. The qualities of the film and those after the film had been kept at 50° C., 60° C. or 70° C. for a week were evaluated according to the methods (C) mentioned above, and their data are shown in Table 3.

Comparative Example 4

The qualities of 25 μm-thick film made of the copolymer pellet produced in Comparative Example 1 and those after the film had been kept at 50° C., 60° C. or 70° C. for a week were evaluated according to the methods (C) mentioned above, and their data are shown in Table 3.

Comparative Example 5

A propylenic random copolymer was produced in the same manner as in Example 1, except that diethyl phthalate was used in place of di-n-butyl phthalate, that 1 mmol/kg-PP of cyclohexylmethyldimethoxysilane was used in place of dicyclopentyldimethoxysilane, and that the ethylene concentration and the hydrogen concentration in the polymerization system were 1.5 mol % and 3.5 mol %, respectively. The resin characteristics of the propylenic random copolymer pellets obtained herein were evaluated according to the methods (A) mentioned above, and their data are shown in Table 3. These pellets were sheeted into 25 μm-thick films according to the method (B) mentioned above. The qualities of film and those after the film had been kept at 50° C., 60° C. or 70° C. for a week were evaluated according to the methods (C) mentioned above, and their data are shown in Table 3.

TABLE 2

|  |  | Example 1 | Example 2 | Example 3 | Comparative Example 1 | Comparative Example 2 | Comparative Example 3 |
|---|---|---|---|---|---|---|---|
| Pellets | $C_2"$ Content, wt. % | 1.0 | 2.1 | 3.2 | 0.0 | 2.2 | 0.0 |
|  | MI, g/10 min | 7.0 | 7.5 | 5.9 | 5.9 | 10.8 | 6.9 |
|  | Boiling Diethyl Ether Extraction, wt. % | 1.0 | 1.2 | 1.6 | 0.6 | 2.3 | 1.7 |
|  | Melting Point, ° C. | 155.5 | 147.8 | 140.8 | 166.0 | 149.0 | 161.7 |
|  | Isotactic Triad Fraction, mol % | 99.1 | 99.0 | 99.1 | 99.2 | 97.0 | 96.1 |
|  | Time of Relaxation, sec | 0.377 | 0.370 | 0.394 | 0.399 | 0.314 | 0.447 |
| Film | Film thickness μm |  |  |  | 30 |  |  |
| Quality | Heat-sealing Temperature, ° C. | 146 | 140 | 133 | 155 | 136 | 152 |
|  | Modulus of Tensile Elasticity, MPa | 1280 | 1160 | 1010 | 1300 | 730 | 1120 |
|  | Anti-blocking Characteristic, $N/m^2$, |  |  |  |  |  |  |
|  | condition 1 | 1 | 3 | 6 | 2 | 68 | 21 |
|  | Condition 2 | 1 | 2 | 2 | 1 | 87 | 11 |
|  | Slipping Characteristic, tanθ | 0.20 | 0.19 | 0.21 | 0.30 | 0.18 | 0.10 |
|  | Haze, % | 3.3 | 3.6 | 4.5 | 5.2 | 2.2 | 3.0 |
|  | Impact Resistance (film impact), KJ/m | 12 | 16 | 20 | 7 | 18 | 12 |

Notes:
Anti-blocking characteristic, condition 1: Sticky components + softness and roughness of film surface are the essential factors of controlling the anti-blocking characteristic.
Anti-blocking characteristic, condition 2: Sticky components are the essential factor of controlling the anti-blocking characteristic.

EXAMPLES 4 AND 5

Propylenic random copolymers of Examples 4 and 5 were produced in the same manner as in Example 1, except that the ethylene concentration and the hydrogen concentration in the copolymerization system were changed to those in Table 1 below to thereby control the ethylene content and the molecular weight of those copolymers. The resin character- Comparative Example 6

The qualities of 25 μm-thick film made of the copolymer pellet produced in Comparative Example 1 and those after the film had been kept at 50° C., 60° C. or 70° C. for a week were evaluated according to the methods (C) mentioned above, and their data are shown in Table 3.

TABLE 3

|  |  | Example 4 | Example 5 | Comparative Example 4 | Comparative Example 5 | Comparative Example 6 |
|---|---|---|---|---|---|---|
| Pellets | Ethylene Content, wt. % | 1.9 | 2.9 | 0.0 | 2.2 | 0.0 |
|  | MI, g/10 min | 8.5 | 8.2 | 5.9 | 9.0 | 6.9 |
|  | Boiling Diethyl Ether Extraction, wt. % | 1.1 | 1.4 | 0.6 | 2.3 | 1.7 |
|  | Melting Point, °C. | 150.6 | 143.2 | 166.0 | 149.0 | 161.7 |
|  | Isotactic Triad Fraction, mol % | 99.2 | 99.1 | 99.2 | 97.0 | 96.1 |
|  | Time of Relaxation, sec | 0.341 | 0.350 | 0.399 | 0.344 | 0.447 |
| Film | Film thickness, μm |  |  | 25 |  |  |
|  | Heat-sealing Temperature, °C. | 138 | 131 | 155 | 140 | 153 |
|  | Tensile Modulus, Mpa | 1030 | 910 | 1300 | 730 | 1060 |
|  | Tensile Modulus After a Week |  |  |  |  |  |
|  | at 50° C. | 1040 | 940 | 1350 | 740 | 1030 |
|  | at 60° C. | 1100 | 900 | 1330 | 780 | 1090 |
|  | at 70° C. | 1080 | 920 | 1370 | 760 | 1120 |
|  | Anti-blocking Characteristic, N/m² |  |  |  |  |  |
|  | Condition 2 | 6 | 9 | 2 | 87 | 10 |
|  | Condition 3 | 9 | 12 | 2 | 100 or more | 18 |
|  | Condition 4 | 13 | 18 | 4 | 100 or more | 30 |
|  | Slipping Characteristic, tanθ | 0.12 | 0.10 | 0.30 | 0.30 | 0.29 |
|  | Haze, % | 1.9 | 1.8 | 5.2 | 2.2 | 3.0 |
|  | Haze After a Week |  |  |  |  |  |
|  | at 50° C. | 2.0 | 1.6 | 5.3 | 2.3 | 2.9 |
|  | at 60° C. | 1.8 | 1.6 | 5.4 | bleed albinism | 3.0 |
|  | at 70° C. | 1.9 | 1.7 | 5.6 | bleed albinism | 3.1 |
|  | Impact Resistance (film impact), KJ/m | 15 | 16 | 7 | 16 | 15 |
|  | Impact Resistance After a Week |  |  |  |  |  |
|  | at 50° C. | 14 | 17 | 6 | 15 | 12 |
|  | at 60° C. | 16 | 14 | 3 | 13 | 9 |
|  | at 70° C. | 14 | 15 | 1 | 14 | 6 |

As has been mentioned in detail hereinabove, the propylenic copolymer of the invention has a high crystallinity and a low melting point. Especially, impact strength of the copolymer less deteriorates with age, when the ethylene unit content of the copolymer is from 1 to 4 wt. %. The film made of the copolmer has good heat-sealability, high stiffness, good anti-blocking and slipping properties, and high transparency without interfering with the intrinsic good characteristics of polypropylene films.

Accordingly, the copolymer of the invention is favorably used to form single-layered films and also to form substrate layers in laminate films to be formed through lamination or co-extrusion.

In the invention, it is unnecessary to use α-olefins having 4 or more carbon atoms, such as 1-butene. The ethylene-propylene binary random copolymer of the invention can be sheeted into high-quality films having good properties such as those mentioned hereinabove. The monomer costs in the invention are low.

While the invention has been described in detail and with reference to specific embodiments thereof, it will be apparent to one skilled in the art that various changes and modifications can be made therein without departing from the spirit and scope thereof.

What is claimed is:

1. A propylenic copolymer of propylene and ethylene, that satisfies the following conditions (1) to (5);
   (1) The ethylene unit content (x, wt. %) of the copolymer is from 0.2 to 4 wt. %;
   (2) The relation between the boiling diethyl ether extraction (E, wt. %) of the copolymer and x satisfies the formula:

$$E \leq 0.25x + 1.1 \qquad (I);$$

(3) The relation between the melting point (Tm, °C.) of the copolymer as measured with a differential scanning calorimeter and x satisfies the formula:

$$Tm \leq 165 - 5x; \qquad (II)$$

(4) The copolymer has a melt index (MI, g/10 min) of from greater than 4 to 12 g/10 min; and
   (5) The isotactic triad fraction (mm, mol %) in the PPP sequence of the copolymer, as measured in $^{13}$C-NMR, is not smaller than 98.0 mol %.

2. The propylenic copolymers as claimed in claim 1, in which the propylenic copolymer further satisfies the following (6):

(6) The relation between the melt index (MI, g/10 min) of the copolymer and the time of relaxation ($\tau$, sec) of the copolymer as obtained through measurement of frequent dependency at a frequency $\omega_o=100$ rad/sec satisfies the following (III):

$$\tau \leq 0.65-0.025 \text{ MI} \qquad \text{(III)}.$$

3. A film as formed by sheeting the propylenic copolymer of claim 1.

4. A film as formed by sheeting the propylenic copolymer of claim 2.

* * * * *